United States Patent [19]

Kovacs

[11] 4,219,114

[45] Aug. 26, 1980

[54] CONVEYOR STOP STRUCTURE

[75] Inventor: Walter B. Kovacs, Orange, Calif.

[73] Assignee: Mid-West Conveyor Company, Inc., Kansas City, Kans.

[21] Appl. No.: 879,442

[22] Filed: Feb. 21, 1978

[51] Int. Cl.$^2$ ............................................. B65G 13/02
[52] U.S. Cl. .................................. 198/780; 193/35 A; 198/784
[58] Field of Search ............... 193/35 R, 35 A, 35 SS, 193/35 G, 35 B; 198/780, 781, 782, 784, 633, 491, 492, 783, 430, 474; 188/32

[56] References Cited

U.S. PATENT DOCUMENTS

| | | | |
|---|---|---|---|
| 1,459,722 | 6/1923 | Erslev | 198/474 X |
| 3,199,657 | 8/1965 | Harrison | 198/781 |
| 3,881,585 | 5/1975 | Coleman et al. | 193/35 A |
| 4,081,073 | 3/1978 | Zappia | 198/430 |
| 4,088,221 | 5/1978 | Bowser | 193/35 A X |

FOREIGN PATENT DOCUMENTS 2128049 12/1971 Fed. Rep. of Germany ........ 193/35 A

*Primary Examiner*—Robert B. Reeves
*Assistant Examiner*—Douglas D. Watts
*Attorney, Agent, or Firm*—Fishburn, Gold and Litman

[57] ABSTRACT

A conveyor stop structure arrests the forward motion of a selected article carried by a belt driven live roller conveyor and simultaneously disengages an associated roller from powered engagement with the belt. The stop structure includes a stop connected to conveyor frame members for upward pivotal movement, and a roller contacting cam for raising a selected roller from powered engagement with the belt. The stop has an angled lower portion which receives a bottom leading edge of the article and lifts at least the bottom leading edge from contact with another roller as the article swings the stop rearwardly and upwardly.

15 Claims, 6 Drawing Figures

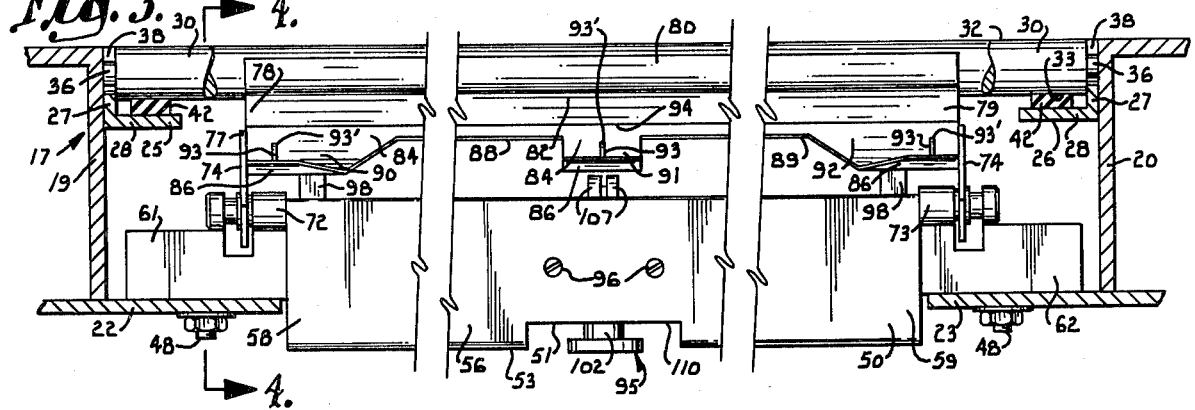
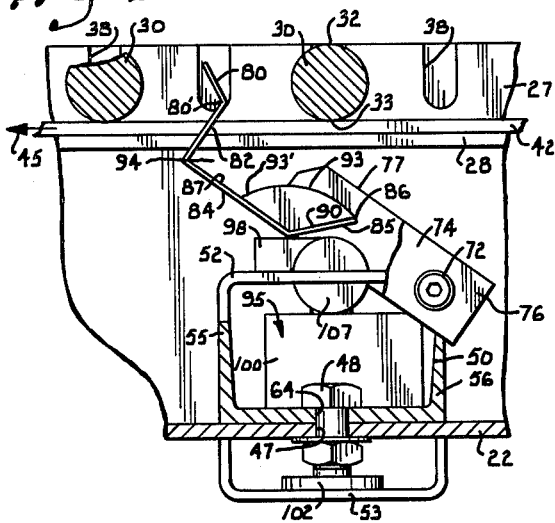
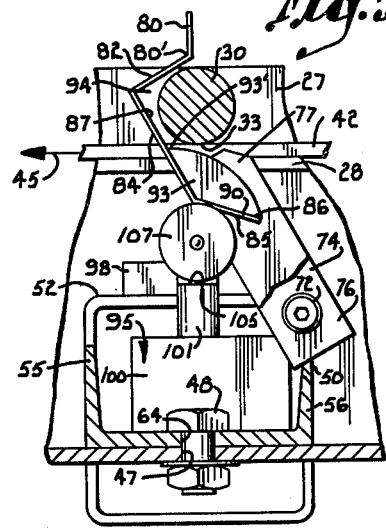
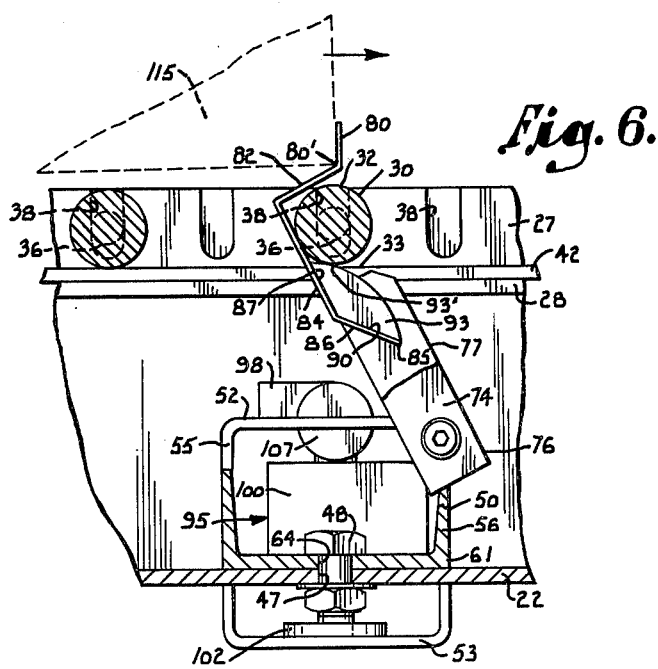

CONVEYOR STOP STRUCTURE

This invention relates to power driven or "live" roller conveyors and more particularly to an article stopping device for use therewith which also functions to disengage the driving member from an adjacent roller.

Various roller conveyors having devices capable of arresting articles therealong and deactivating the drive of adjacent rollers have been developed over the past several years. However, such devices are usually complex and involve separate mechanisms for arresting the forward motion of the article and deactivating the drive.

This invention involves a combination article stop and lifting member which may be selectively associated with a particular roller or positioned along the conveyor and utilizes the forward motion of a propelled article to contact and urge the roller out of engagement with the roller driver. The stop also may function to slightly lift the article out of engagement with a roller or rollers upstream from the stop associated roller, and thereby provide further roller drive disengagement from the article when substantial propelling force is no longer needed due to the arrested condition of the article.

The principal objects of the present invention are: to provide a stop structure for a roller conveyor having a simple, unitary arrangement for stopping an article and simultaneously deactivating an adjacent roller; to provide such a structure which reduces energy requirements of the conveyor drive; to provide an article stop arrangement which reduces drag and associated wear of the conveyor article; to provide such a stop structure which directly utilizes the forward motion of a propelled article for lifting a powered roller from engagement with a driving belt; to provide such a mechanism which may partially lift the article out of engagement with a driven roller or rollers upstream from the stop associated roller, thereby further reducing unnecessary drive engagement when the article is in an arrested condition; and to provide such an arrangement for a roller conveyor which is relatively inexpensive, reliable, easily maintained and extremely well adapted for its intended purposes.

Other objects and advantages of this invention will become apparent from the following description taken in connection with the accompanying drawings wherein are set forth by way of illustration and example, certain embodiments of this invention.

The drawings constitute a part of this specification and include exemplary embodiments of the present invention and illustrate various objects and features thereof.

FIG. 3 is a fragmentary front elevational view showing a portion of the conveyor and the conveyor stop structure.

FIG. 4 is a fragmentary sectional view in side elevation of the conveyor and conveyor stop structure taken on the line 4—4, FIG. 3, and showing the conveyor stop structure in a first or retracted position.

FIG. 5 is a fragmentary sectional view in side elevation similar to FIG. 4 and showing the stop structure in a second or roller engaging position.

FIG. 6 is a fragmentary sectional view in side elevation similar to FIG. 5 and showing the stop structure in a third position stopping an article carried by the conveyor, disengaging the associated roller from the driving belt and slightly lifting the article off of an upstream driven roller.

Figure 1:
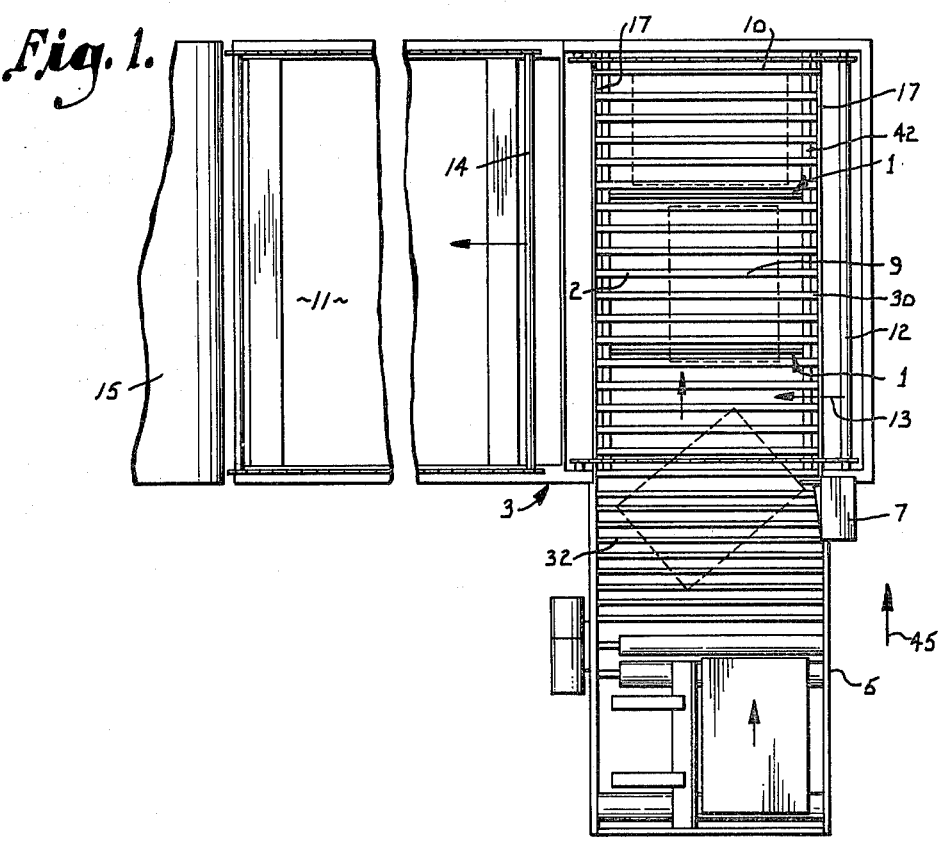
FIG. 1 is a top plan view showing a portion of an accumulating live roller conveyor associated with a palletizing apparatus and including stop structures embodying this invention.
Figure 2:
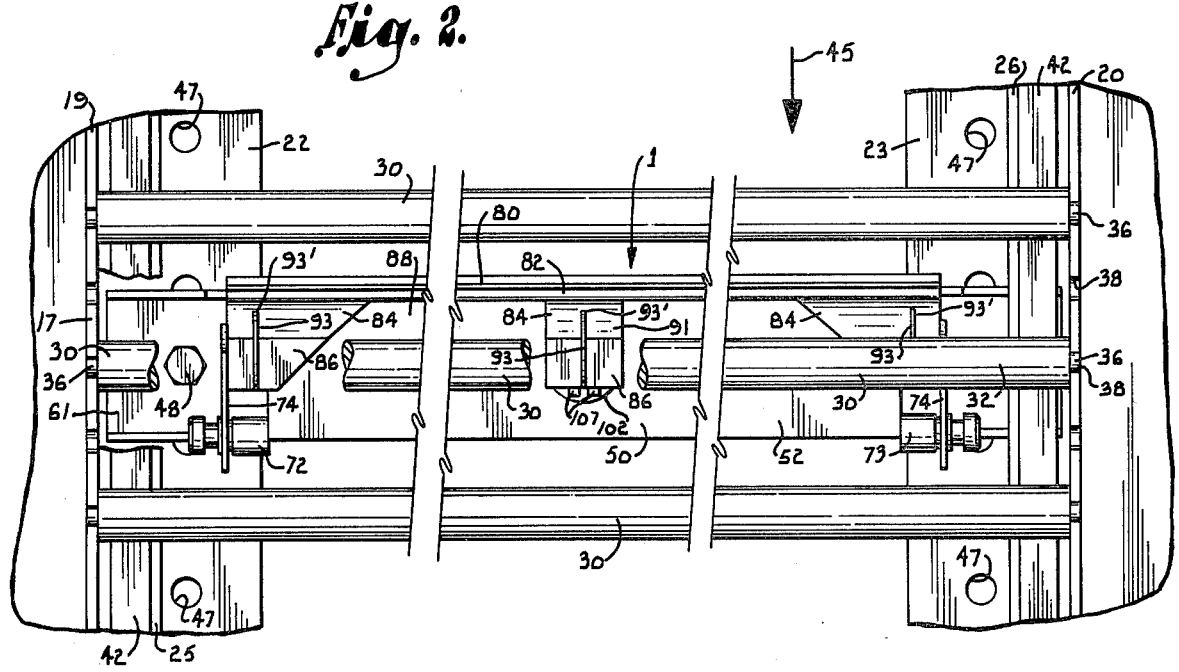
FIG. 2 is a fragmentary top plan view of a portion of the conveyor showing the conveyor stop structure.

Referring more in detail to the drawings:

The reference numeral 1, FIG. 2, refers generally to a conveyor stop structure embodying this invention which is selectively positioned in a live roller conveyor 2 which, in the illustrated example, forms part of a palletizing apparatus 3 of the general type shown in U.S. Pat. No. 3,420,385. The palletizing apparatus 3, in this example, includes an article counting and alignment section 5 associated with the live roller conveyor 2 and having a turner 7 for selectively rotating articles thereon. A row accumulating area 9, of the conveyor 2, includes the conveyor stops 1 and provides a zone in which differently oriented articles may be arrested in forward motion 10 at preset positions or intervals. Thus, spaces can be retained between the variously oriented articles to properly form a layer of articles on a layer accumulating area 9 by a chain driven sweep bar 12 synchronized to move thereacross in a direction 13. After several lines of articles are transferred to the layer accumulating table 11, a sweep bar 14 similar to the bar 12, transfers the layer of articles to an apron 15 which is subsequently slid out therefrom whereby the articles are deposited onto a pallet (not shown).

In the illustrated example, the conveyor 2 includes conveyor frame members 17 associated with spaced apart beams 19 and 20 having inwardly extended, opposed, bottom flanges 22 and 23. Inwardly extended angle beams 25 and 26 are mounted on the beams 19 and 20 and have webs 27 and flanges 28. A plurality of laterally positioned, spaced apart elongated driving rollers 30 are rotatably mounted between the beams 19 and 20, forming an article supporting surface 32 generally tangent to the upper surfaces of the rollers 30 and a roller driving surface 33 generally tangent to the lower surface of the roller 30. The rollers 30 rotate on axles 36 which lie by gravitational force in the bottom of vertically elongated or U-shaped enlarged bearing openings 38 formed at intervals in the webs 27. In the illustrated example, spare bearings openings 38 are included in the web 27 alternating with those having rollers 30 therein.

A propelling member in the form of a resilient, endless belt 42 is continuously powered during conveyor operation in the direction of the arrow 45 by suitable conventional driving structure (not shown). The belt 42 is supported by the flanges 28 and extends longitudinally of the article supporting surface 32 beneath the rollers 30 and frictionally contacts the roller driving surface 33.

A series of spaced bores 47 adapted for receiving fasteners therein, such as bolts 48, extend through the bottom flanges 22 and 23 and are spaced to be generally vertically aligned under an associated roller 30. The conveyor stop structure 1 extends transversely between the beams 19 and 20 and is selectively positioned along the length of the conveyor 2 on the flanges 22 and 23 by use of selected bores 47.

The conveyor stop structure 1 is comprised of a generally elongated frame 50 having, in the present example, a rectangularly positioned top 52, bottom 53, and opposed walls 55 and 56 with opposite ends 58 and 59. Brackets 61 and 62 extend longitudinally outward from the ends 58 and 59 and have bores 64 for extending the bolt 48 therethrough and through the bore 47 to connect the frame 50 to the frame 17.

A combination article stop and lifting member 70 is positioned at least partly below the level of the rollers 30 when in its retracted or article passing and belt engaging position, FIG. 4, and is pivotally connected to the frame 50. In the illustrated example, a pair of connecting means, including a pair of axle shafts 72 and 73, extend longitudinally outwards of the ends 58 and 59 from the juncture of the top 52 and the wall 56. A pair of connectors, such as straps 74, are rotatably connected to the axle shafts 72 and 73 at a lower end 76 and rigidly connected to the end margins 78 and 79 of the stop and lifting member 70 at an upper end 77. By this manner of connection, the stop and lifting member 70 may swing upwardly and toward a roller 30 to direct the roller 30 toward an article stopping and belt disengaging position, FIG. 5, or downwardly and out of the path of articles carried by the conveyor, FIG. 4.

In the illustrated example, the stop and lifting member 70 is formed by a bent section of sheet material. An elongated structure is formed which extends substantially the length of a roller 30 to provide even engagement therewith. Several longitudinally angled portions are included in the illustrated example, among them, a generally upwardly projecting tang or stop 80 which extends through the article support surface 32 when the lifting member is in its extended position, FIG. 6. In the illustrated example, the stop 80 forms an obtuse angle of approximately 120° from a roller covering first portion 82. The first portion 82 extends normally to a relatively wider roller engageable second portion 84 which extends toward and forms an obtuse angle of approximately 133° with a lower portion 86. Thus, a cradle shaped receptacle is formed by the first portion 82 and the lower portion 86, the second portion 84 thereof forming a web between the flange-like portions.

The straps 74 are connected to the stop and lifting member 70 at the end margins of the second portion 84 and the lower portion 86, retaining a substantial end marginal segment of the second portion 84 free of the straps 74 for receiving a roller 30. In the illustrated example, FIG. 3, angled recesses 88 and 89 are formed in the stop and lifting member 70 between the ends 78 and 79, having spaced end support portions 90 and 92 and a medial support portion 91 for supporting members, described below, for lifting the associated roller 30. The support portions 90, 91 and 92 have lifting cams 93 extending slightly into the receptacle area and between the lower portion 86 and the second portion 84. In one form, the cams 93 are circular segments in shape and extend into the receptacle area only partway and thereby define a receiving cage 94 which is approximately equal in vertical dimension to the diameter of the roller 30 for receipt thereof, FIGS. 5 and 6. The cams 93 have peripheral cam edges or surfaces 93' which are located, with respect to the associated roller 30, so that they cooperate in slightly raising the roller out of contact with the belt 42 upon sufficient rotation of the stop and lifting member 70, FIG. 6.

An area for engaging and retaining the bottom forward corners of selected packages propelled along the article supporting surface 32 is formed along the juncture 80' of the tang 80 and the first portion 82. The tang 80 engages the oncoming front wall of an article 115 and is pushed slightly upwardly and in the direction of conveyor travel. Concurrently, in the illustrated example, the bottom edge of the article rides upwardly a slight distance onto the first portion 82, thereby becoming slightly spaced and disengaged from at least an adjoining roller.

The stop and lifting member 70 is generally upwardly rotatable between an extended, or roller engaging position in FIGS. 5 and 6 and a downward or resting position, FIG. 4, reposed against stops 98 on the frame 50. The frame 50 includes a pair of said stops 98 which, in the illustrated example, are block-like and positioned on the frame top 52. The stops 98 are located adjacent the frame ends 58 and 59 and abut the juncture of the second portion 84 and the lower portion 86 to limit downward movement of the stop and lifting member 70.

The stop and lifting member 70 is moved toward the extended position by a motive means 95 positioned in the approximate longitudinal midportion of the frame 50 and secured thereto as by suitable fasteners 96. In the illustrated example, the motive means 95, take the form of an electromagnetic solenoid 100 having a reciprocable shaft 101 extended vertically therethrough. The shaft 101 has a lower or headed end 102 and an upper end 105 to which a pair of rollers 107 are rotatably connected. To provide access to the solenoid 100, the medial portion 51 of the housing member 50 is open and comprises an area through which the headed end 102 of the solenoid shaft 101 extends when in its retracted position, FIG. 4. When actuated, the shaft 101 reciprocates upwardly so that the rollers 107 engage the bottom surface 85 of the lower portion 86 and rotate as the stop and lifting member 70 is urged upwardly, FIG. 5.

In operation, when the conveyor stop structure 1 is to be used in conjunction with a palletizer as illustrated, rollers 30 are positioned in the spare bearing openings 38 as desired to form the article supporting surface 32. Then the conveyor stop structure is positioned as desired under a selected roller 30 to space packages 115 as required to form an interlocking layer thereof for deposition upon a pallet. As described above, the conveyor stop structure 1 is selectively connected to bores 47 for proper placement in the conveyor line and under an associated roller.

The passing of an article beyond a counting point in the conveyor line activates a sensing means (not shown) which in turn directs a signal to the motive means 95, causing the solenoid 100 to be energized and extend the shaft 101 upwardly. The wheels 107 contact and urge the stop and lifting member 70 upwardly, FIG. 5, so that the stop 80 thereof projects above the article supporting surface 32 of the rollers 30 and into the path of an oncoming article 115. The bottom corner of the article 115 pushes against the stop 80 as described above and simultaneously urges the lifting cams 93 into engagement and lifting contact with the roller 30. The cams 93 slide under the roller 30 and lift it into engagement with the first portion 82 and the second portion 84, lifting the axle shafts 36 slightly in the enlarged bearing openings 38 so that the roller driving surface 33 no longer contacts the drive belt 42, thereby shifting the roller 30 to a belt disengaging position, FIG. 6. Then, as illustrated in FIG. 6, the solenoid 100 may be de-energized and the shaft 101 retracted so that the motive means 95 no longer supports the stop and lifting member 70. In the illustrated example, the motive means 95 urges the stop and lifting member 70 into the path of an oncoming article 115 which in turn provides the necessary force to urge the lifting cams 93 under the roller 30 and lift the roller from the drive means to prevent unnecessary friction and wear on moving parts. In the illustrated example, the article 115 is raised slightly on an end abutting the stop 80 and resting upon the first portion 82 as the stop and lifting member 70 is directed into lifting engagement with the roller 30. As the stop and lifting member 70 arcs upwardly, the bottom of the article 115 is raised a slight distance above adjoining rollers 30, thereby further reducing wear and friction. After the article 115 is removed by the transverse sliding means, such as the sweep bar 13 when used in connection with a palletizing apparatus 3, the stop and lifting member 70 freely swings downwardly out of the article path and against the frame stops 98. Concurrently, the roller 30 slides downwardly in the bearing openings 38 and again engages the drive belt 42, thereby becoming powered.

It is to be understood that, although certain forms of this invention have been illustrated and described, it is not to be limited thereto except insofar as such limitations are included in the following claims.

What is claimed and desired to secure by Letters Patent is:

1. In a powered conveyor having a plurality of laterally disposed, elongated rollers forming an article conveying path tangent to the upper surfaces of said rollers and having said rollers driven by at least one endless belt normally engaging the bottom surface of said rollers, a stop structure comprising:
   (a) conveyor frame members having shiftable roller support means associated with a roller and permitting shifting of said roller between a belt engaging position and a belt disengaged position;
   (b) a combination article stop and roller disengaging device associated with said conveyor;
   (c) said device including a lift arm having a first end thereof pivotally connected with said frame at a pivot point spaced apart from and generally below the conveying path, and a second end thereof having an article stop portion which extends through said conveying path when said device is in said article stopping position;
   (d) said device further including a roller lifting cam mounted on and pivoting with said lift arm, and engaging an associated roller when said device is in said article stopping position for shifting said roller to said belt disengaged position; and wherein
   (e) said lift arm pivot point is positioned downstream of the lift arm second end, such that said stop portion engages the leading edge of an oncoming article, whereby the kinetic energy of said article pivots the lift arm in a downstream direction thereby arresting the forward motion of the article at a predetermined position, and simultaneously engaging the lifting cam with said associated roller and disengaging the roller from the belt to reduce conveyor drag.

2. The stop structure set forth in claim 1 including:
   (a) a support frame positioned generally below said roller; and wherein
   (b) said device is connected to said support frame by a pivotal means permitting pivoting of said device upwardly toward said article conveying path.

3. The stop structure set forth in claim 2 wherein:
   (a) said pivotal means is connected to said support frame along an axis disposed downstream from a vertical plane containing the axis of said roller.

4. The stop structure set forth in claim 1 including:
   (a) sweep arm structure connected to said conveyor and movable laterally across said article conveying path and removing articles arrested by said stop portion when said device is in said article stopping position.

5. The stop structure as set forth in claim 1 wherein:
   (a) said device includes detachable mounting means selectively connectible at alternate positions along said conveyor frame members, thereby permitting said device to be associated with a selected roller.

6. The stop structure set forth in claim 1 wherein:
   (a) said roller support means include opposed, vertically elongated bearing openings receiving said roller therebetween, said roller being shiftable upwardly in said bearing openings to said belt disengaged position.

7. In a powered conveyor having a plurality of laterally disposed, elongated rollers forming an article conveying path tangent to the upper surfaces of said rollers and having said rollers driven by at least one endless belt normally engaging the bottom surface of said rollers, a stop structure comprising:
   (a) conveyor frame members having shiftable roller support means associated with a roller and permitting shifting of said roller between a belt engaging position and a belt disengaged position;
   (b) a combination article stop and roller disengaging device associated with said conveyor and movable between an article stopping position and an article passing position;
   (c) said device including an article stop portion which extends through said conveying path when said device is in said article stopping position;
   (d) said device further including a roller contacting portion engageable with said roller when said device is in said article stopping position for shifting said roller to said belt disengaged position; and
   (e) motive means associated with said device and operable to induce said device to move between said article stopping and article passing positions;
   (f) whereby said roller and belt are disengaged with the projection of said stop portion through said conveying path;
   (g) a support frame positioned generally below said roller;
   (h) said device being connected to said support frame by a pivotal means permitting pivoting of said device upwardly toward said article conveying path;
   (i) said pivotal means being connected to said support frame along an axis disposed downstream from a vertical plane containing the axis of said roller; and
   (j) said device includes a portion positioned adjacent to said stop portion forming a juncture therewith for receipt of an article bottom leading edge when said device is in said article stopping position, said juncture being spaced slightly above said article conveying path when said device is in said article stopping position whereby said article is slightly elevated from said article conveying path at least along said bottom leading edge.

8. In a powered conveyor having a plurality of laterally disposed, elongated rollers forming an article conveying path tangent to the upper surfaces of said rollers and having said rollers driven by at least one endless belt normally engaging the bottom surface of said rollers, a disengagement structure comprising:

(a) conveyor frame members having shiftable roller support members associated with a roller and permitting vertical shifting of said roller between a belt engaging position and a belt disengaged position;
(b) a roller disengaging device associated with said conveyor and movable to urge said roller from said belt engaging position toward said belt disengaged position and including a roller contacting portion engageable with said roller;
(c) motive means associated with said device and operable to move said device toward said roller; an article contacting stop associated with said device and operable to further move said device upon article engagement therewith; and wherein
(d) said roller contacting portion includes a lifting cam having an engagement surface sloping upwardly relative to said roller bottom surface when moved thereagainst, thereby inducing upward shifting of said roller from said belt engaging position to said belt disengaged position.

9. In a powered conveyor having a plurality of laterally disposed, elongated rollers mounted in a frame and forming an article conveying path tangent to the upper surfaces of the rollers, and having the rollers driven by at least one endless belt, an article stop and lifting device comprising:
(a) a lift arm intermediate to the ends of said article conveying path and having a first end thereof movably connected with said conveyor frame generally below the conveyor path; said lift arm having a second end spaced apart from said lift arm first end and movable upwardly upon movement of said left arm first end;
(b) a tang connected and moving with the second end of said lift arm, and including a stop shaped for abutment with an article moving on said conveyor path and a pad connected therewith and adapted for receiving and supporting thereon a leading edge of said article;
(c) means limiting lift arm movement in a stop mode between an initial stop position, wherein said stop protrudes into the conveying path and said pad is disposed at an elevation substantially commensurate with said conveying path, and a final stop position, wherein said pad is disposed at an elevation above the upper surfaces of the rollers; and wherein
(d) said lift arm first end is positioned such that, in the initial stop position, the tang abuts and engages the leading edge of an oncoming article, whereby the kinetic energy of said article moves the lift arm with said article in a downstream direction into the final stop position, thereby arresting the forward motion of the article at a predetermined position and lifting the leading edge of the article generally upwardly off at least one of the rollers disposed thereunder for reducing conveyor drag.

10. The stop device set forth in claim 9 including:
(a) motive means associated with said device and operable to induce movement of said device between an article stopping and an article passing position.

11. The stop structure set forth in claim 10 wherein:
(a) said motive means includes an electromagnetic solenoid having a reciprocable shaft extendible upon actuation to elevate said device toward said article conveying path.

12. In a powered conveyor having a plurality of laterally disposed, elongated rollers mounted in a frame and forming an article conveying path tangent to the upper surfaces of the rollers, and having the rollers driven by at least one endless belt, an article stop and lifting device comprising:
(a) a lift arm having a first end thereof movably connected with said conveyor frame generally below the conveying path; said lift arm having a second end spaced apart from said lift arm first end;
(b) a tang connected and moving with the second end of said lift arm, and including a stop shaped for abutment with an article moving on said conveyor path and a pad connected therewith and adapted for receiving and supporting thereon a leading edge of said article;
(c) means limiting lift arm movement in a stop mode between an initial stop position, wherein said stop protrudes into the conveying path and said path is disposed at an elevation substantially commensurate with said conveying path, and a final stop position, wherein said pad is disposed at an elevation above the upper surfaces of the rollers; and wherein
(d) said lift arm first end is positioned such that, in the initial stop position the tang abuts and engages the leading edge of an oncoming article, whereby the kinetic energy of said article moves the lift arm in a downstream direction into the final stop position, thereby arresting the forward motion of the article at a predetermined position and lifting the leading edge of the article generally upwardly off of at least one of the rollers disposed thereunder for reducing conveyor drag;
(e) said lift arm is pivotally connected with said conveyor frame at a pivot point spaced apart from the conveying path; and
(f) said lift arm first end is positioned downstream of the lift tang.

13. The stop device set forth in claim 12 wherein:
(a) said lift arm is rotatable about an axis which extends transversely across said conveyor and is substantially parallel with the axes of said rollers.

14. The stop device set forth in claim 13 including:
(a) a roller disengaging device connected with said lift arm and disengaging the roller disposed under the leading edge of said article in the final stop position for reducing conveyor drag and wear; and
(b) motive means associated with said device and operable to induce movement of said device between an article stopping and an article passing position.

15. In a powered conveyor having a plurality of laterally disposed, elongated rollers mounted in a frame and forming an article conveying path tangent to the upper surfaces of the rollers, and having the rollers driven by at least one endless belt, an article stop and lifting device comprising:
(a) a lift arm having a first end thereof movably connected with said conveyor frame generally below the conveying path; said lift arm having a second end spac ed apart from said lift arm first end;
(b) a tang connected and moving with the second end of said lift arm, and including a stop shaped for abutment with an article moving on said conveyor path and a pad connected therewith and adapted for receiving and supporting thereon a leading edge of said article;

(c) means limiting lift arm movement in a stop mode between an initial stop position, wherein said stop protrudes into the conveying path and said pad is disposed at an elevation substantially commensurate with said conveying path, and a final stop position, wherein said pad is disposed at an elevation above the upper surfaces of the rollers; and wherein (d) said lift arm first end is positioned such that, in the initial stop position, the tang abuts and engages the leading edge of an oncoming article, whereby the kinetic energy of said article moves the lift arm in a downstream direction into the final stop position, thereby arresting the forward motion of the article at a predetermined position and lifting the leading edge of the article generally upwardly off of at least one of the rollers disposed thereunder for reducing conveyor drag and including (e) a roller disengaging device connected with said lift arm and disengaging the roller disposed under the leading edge of said article in the final stop position for reducing conveyor drag and wear.

* * * * *